(No Model.)
J. L. V. BRACK & C. P. COY.
CUTTER BAR.
No. 459,740. Patented Sept. 22, 1891.
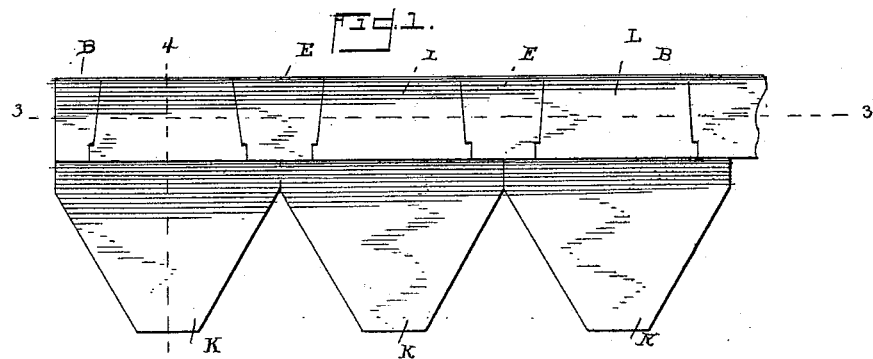
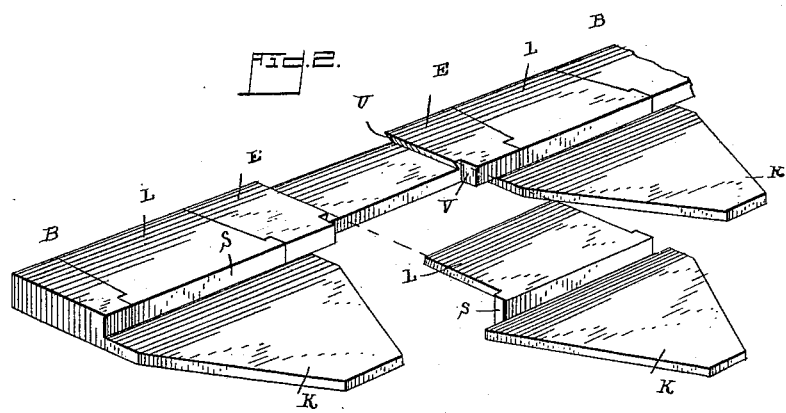
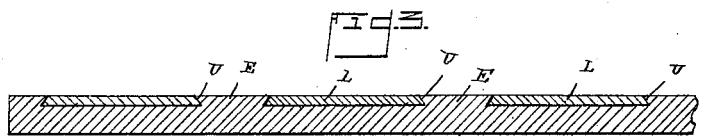
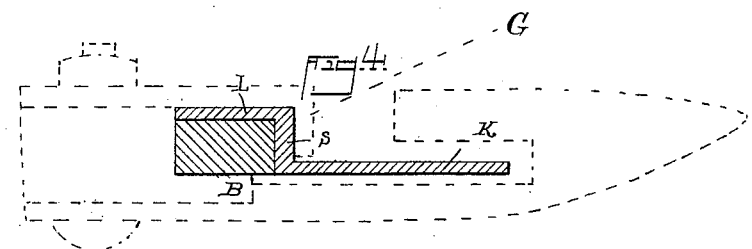
Witnesses
Chas. A. Ford.
N. S. Collamer
Inventors
Julius L. V. Brack
Commodore P. Coy.
By their Attorneys,
C. A. Snow & Co.

UNITED STATES PATENT OFFICE.

JULIUS L. V. BRACK, OF UNIONVILLE, MICHIGAN, AND COMMODORE P. COY, OF FORT WAYNE, INDIANA.

CUTTER-BAR.

SPECIFICATION forming part of Letters Patent No. 459,740, dated September 22, 1891.

Application filed May 19, 1891. Serial No. 393,317. (No model.)

*To all whom it may concern:*

Be it known that we, JULIUS L. V. BRACK, of Unionville, in the county of Tuscola and State of Michigan, and COMMODORE P. COY, of Fort Wayne, in the county of Allen and State of Indiana, citizens of the United States, have invented a new and useful Cutter-Bar, of which the following is a specification.

This invention relates to harvesters, and more especially to the cutter-bars thereof; and the object of the same is to effect certain improvements therein.

To this end the invention consists in the specific details of construction hereinafter more fully described and claimed, and as illustrated on the sheet of drawings, wherein—

Figure 1 is a plan view of a portion of our improved cutter-bar. Fig. 2 is an enlarged perspective view thereof with one of the knives removed therefrom and located in position to be replaced. Fig. 3 is a longitudinal section on the line 3 3 of Fig. 1. Fig. 4 is a section at right angles thereto, showing the finger-bar guide and a finger in dotted lines.

Referring to the said drawings, the letter B designates the bar proper, which, it is understood, is reciprocated in any suitable manner in proper guides, all as common in harvester-machines now in use and forming no part of the present invention. Throughout the length of this bar are formed enlargements E at regular intervals, as shown, and such enlargements project from the upper and front faces of the bar and may be integral therewith or secured fixedly thereon, as preferred. The edges of these enlargements are undercut, as at U, where they are horizontal, and are plain, as at V, where vertical.

K are the knives, each of which has rising from its rear edge a shank S, of a size to fit closely between any two of the vertical faces V, and projecting rearward from the upper end of the shank a lip L, with beveled edges, adapted to be clamped between any two of the undercut edges U.

In practice the knives are separately manufactured, sold, ground, and treated, and when it is desired to connect one with the bar B the latter is first removed from the guides in which it reciprocates and also disconnected from the reciprocating mechanism. The old knife is then removed by tapping it gently on its rear edge and forcing the lip L forward out of place between the two undercut edges U U. The new lip L is then inserted therein, and by gently pounding or pressing on the face of the shank S the whole knife may be moved to the rear and seated in position. The complete bar is then replaced in its guides, (see dotted lines, Fig. 4,) and when in place it will be understood that the shank of the knives will abut against the guides and prevent them from becoming displaced. Should the knives become loose or any one of them wabble, it is removed and the rear face of the shank S is filed off a trifle. The lip L is preferably made slightly tapering toward its rear end and the space between the undercut edges the same, and hence when the shank is filed off, as stated, and the knife and lip permitted to move a little farther to the rear a broader part of the lip is brought between the undercut faces, and the whole is thereby tightened.

By a slight change in the construction of parts the shank S may project downward and the lip L pass beneath the bar instead of over the same; and other minor changes in the details of construction may be made without departing from the spirit of our invention.

We claim as the salient features—

1. In a cutter-bar, the combination, with the bar having enlargements thereon whose horizontal faces are undercut and converge toward the rear and whose vertical faces are plain and stand at the front edge of the bar, of the knives, each having at its rear edge a vertical shank fitting between said plain faces, and a tapering lip projecting rearward from said shank and having beveled edges fitting between said undercut faces, as and for the purpose set forth.

2. In a cutter-bar, the combination, with the bar having enlargements thereon whose horizontal faces are undercut and whose vertical faces are plain and stand at the front edge of the bar, of the knives, each having at its rear edge a vertical shank fitting between said plain faces, and a lip projecting rearward from said shank and having beveled edges fitting between said undercut faces, as and for the purpose hereinbefore set forth.

In testimony that we claim the foregoing as our own we have hereto affixed our signatures in presence of two witnesses.

JULIUS L. V. BRACK.
COMMODORE P. COY.

Witnesses:
JOHN C. MATHEWS,
WALTER B. BLISS.